H. B. ARDEN.
TUNNEL BORING MACHINE FOR EARTH.
APPLICATION FILED MAY 8, 1908.

1,173,158. Patented Feb. 29, 1916.
6 SHEETS—SHEET 4.

Witnesses:
Francis G. Forham
Warren L. Sawyer

Inventor
Henry B. Arden
By his Attorney
O. Ellery Edwards Jr.

UNITED STATES PATENT OFFICE.

HARRY B. ARDEN, OF NEW YORK, N. Y.

TUNNEL-BORING MACHINE FOR EARTH.

1,173,158.  Specification of Letters Patent.  Patented Feb. 29, 1916.

Application filed May 8, 1908. Serial No. 431,711.

*To all whom it may concern:*

Be it known that I, HARRY B. ARDEN, a citizen of the United States, and a resident of the city, county, and State of New York, have invented a new and useful Improvement in Tunnel-Boring Machines for Earth, of which the following is a specification.

The object of my invention is to provide a machine of this class which will excavate and load earth, sand, gravel, clay or other similar material encountered in tunnel boring.

In my co-pending case, Serial Number 422,208 is shown and described a machine for tunnel boring through rock.

Briefly stated, the object of my invention herein described is to provide a machine which will bore through any material not requiring the use of said rock boring machine. In other words, I provide a machine which is suitable for any material that may be encountered in tunnel boring operations, one machine being suitable for rock and the other for all other material that may be encountered. This object is accomplished in so far as material other than rock is concerned, by my invention herein described, which embodies an excavating apparatus, a loading apparatus, a shield to protect both the excavator and loader, means for hoisting and setting the segments composing the outer tunnel lining, means for supporting and moving the machine from time to time, as the exigencies of the work may require, and certain other details as will appear below.

For a more particular description of my invention reference is to be had to accompanying drawings forming a part hereof in which—

Fig. 2 is a longitudinal section of the same. Figs. 2ª, 2ᵇ, 2ᶜ and 2ᵈ, show details of construction.

Throughout the various views of the drawings similar reference characters designate similar parts.

While the same fundamental ideas underlie all the embodiments of my invention, these embodiments differ somewhat in details, according to the requirements of the work, so that I will proceed by first describing the simplest form of apparatus, which is shown in Figs. 1 to 6 inclusive, and follow this with a description of the more complicated apparatus shown in the remaining figures. The description of the operation will be in the same order. Referring to Figs. 1 to 6 inclusive, 1 indicates the boring apparatus which consists essentially of a shield 2 supported by radial arms 3 from a center disk 4 carried on a hollow shaft 5, which is fixedly mounted in a pillow block 6, which is carried on the carriage 7, which carriage is supported on the base 8 when being moved, as will appear below. At other times it is supported independent of the base 8 by the floor of the tunnel in a manner which will be more particularly hereinafter described. Inside of the hollow shaft 5 is a second hollow shaft 9 mounted to revolve therein, and having at its forward end a hub 10 and from which extend the radially disposed spokes 11 to the rim or ring 12, concentric with the shield 2 and mounted to revolve within said shield. The rim or ring 12 also has the inwardly and diagonally disposed vanes 13 which serve to carry the excavated material a limited distance and then discharge the same, as will appear below. On the outside of the rim 12 are mounted the smaller vanes 13ª, diagonally placed as are the vanes 13 and are for the purpose of keeping the space between the outside of rim 12 and the inside of shield ring 2 free from excavated material, such material being discharged on to the chute 18, thus permitting the rim 12 to revolve without undue friction. 13ª in Fig. 2ᵇ shows this smaller vane in cross section. The rim 12 and the attached parts revolving therewith constitute a loader. Within the shaft 9 is a hollow shaft 14 to the forward end of which is fixed a disk 15 on which is fixedly mounted a channel iron 16, to which the excavating tool 17 is attached. This tool 17 and its attached parts may be termed an excavator. The excavated material falls from the excavating tool 17 upon the rim 12 and vanes 13 and as the rim is revolved the material falls from the vanes 13 on to a chute 18 and from there passes on to a conveyer 19 which removes the excavated material to where it is dumped into cars 20. The hollow shaft 5 also has fixed thereon at its inner end a disk 21 to which radially disposed arms 22 are attached, which arms are connected at their extremities by a semicircular ring 23; midway of the extremities these arms 22 are connected with the arms 3 by crossings 24 and at their extremities by crossings 25; rollers 26 are suitably mounted from the ring 23 in a manner more particularly described below, the function of these rollers being to carry the steel segments for lining the tunnel, while they are being bolted in place.

The foregoing is a general statement of the principal features of the invention. Details have been omitted as far as possible and these will be considered in the following part of the specification.

Figure 1:
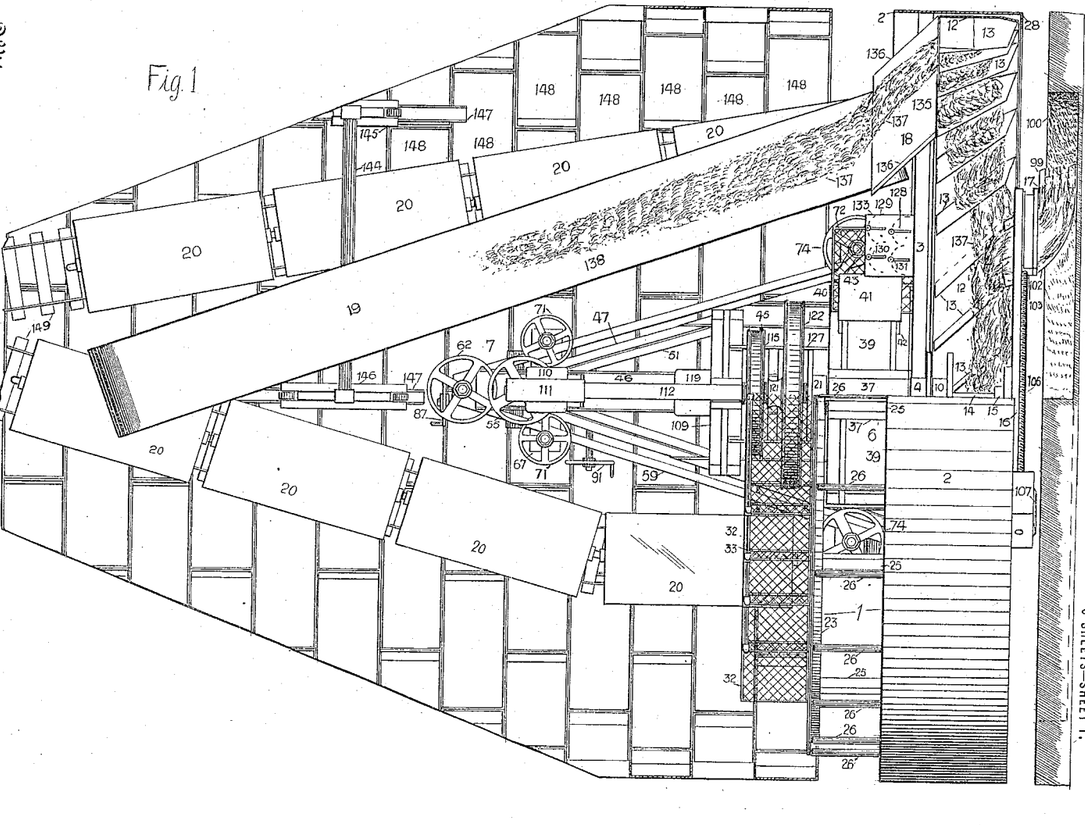
Figure 1 is a plan view of one form of my improved tunnel boring machine, with certain portions being omitted or broken away to show the mechanism.
Figures 2, 2A, 2B, 2C, 2D:
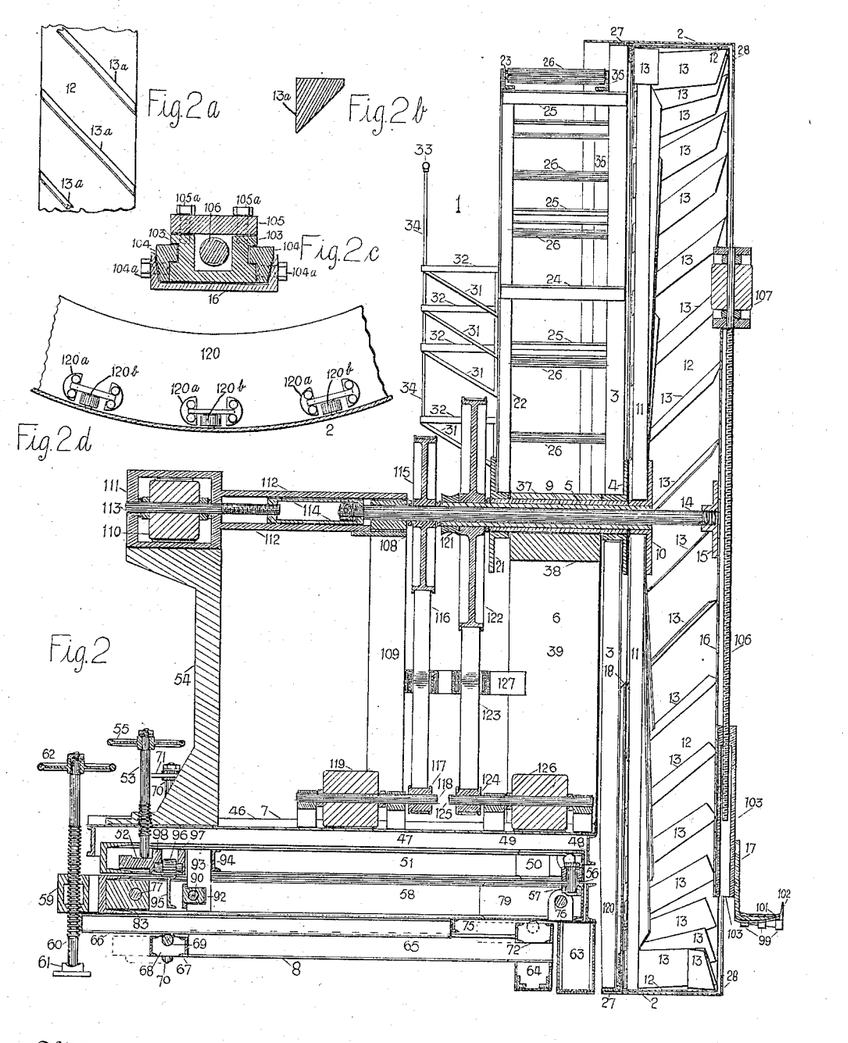
Figure 3:
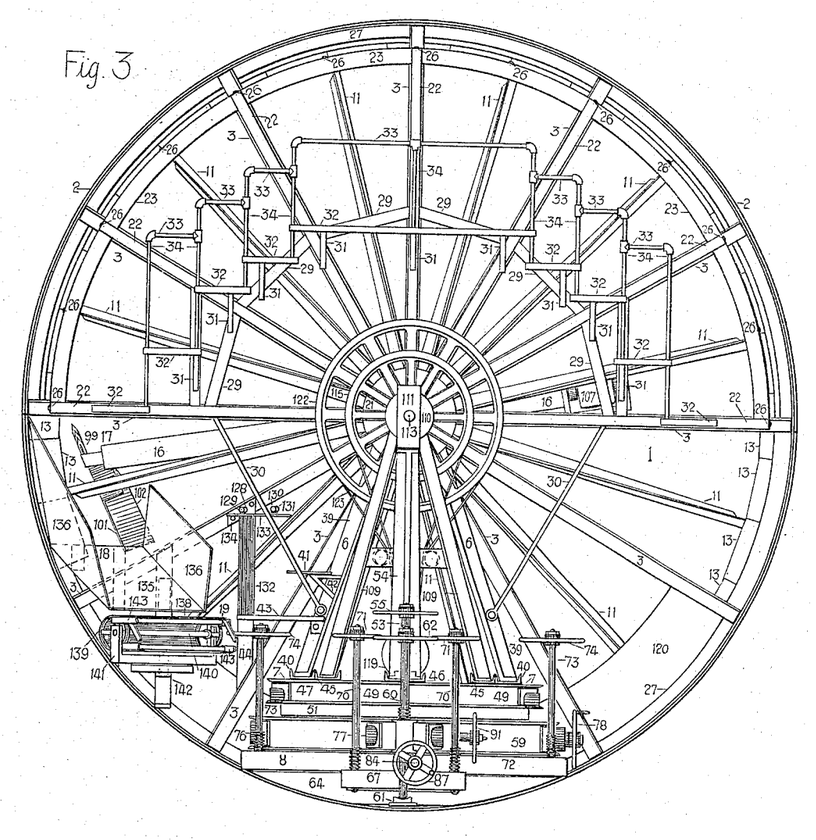
Fig. 3 is a rear elevation of the structure shown in Fig. 1.

*The shield.*—The shield 2 consists of a cylindrical steel ring which extends from the face of the cut where the excavating tool 17 is located to a point partially over the rollers 26. It is made sufficiently strong to support the bore of the tunnel in the event of a cave in. This ring 2 is of sufficient length to inclose the loading rim 12 and radial arms 3 and is extended over the upper 180 degrees of its circle so as to cover partially the rollers 26, which rollers are placed at intervals over an arc of about 180 degrees. Obviously it is unnecessary for the lower portion of the ring to extend so far, so throughout the remaining 180 degrees this shield 2 extends only to the angle ring 27 which is fixed therein and to which radial arms 3 are attached. The front edge of the shield 2 has a reinforcing ring 28, so that this shield 2 is greatly strengthened by the reinforcing rings 27 and 28. The ring 27 as above stated, is fixed to the radially disposed arms 3, which arms are fixed at their inner ends to the disk 4 which is fixed on the hollow shaft 5; on the inner end of shaft 5 is fixed the disk 21 to which are attached the radially disposed arms 22 which extend therefrom, parallel to the arms 3, but only through the upper 180 degrees of the circle. As stated above, these arms 22 are connected by the semi-circular angle metal rim 23 and they are connected to the arms 3 by the horizontal bars 24 and 25. These radially disposed arms 22 are also connected to each other by the bars 29 and the lowest arms 22 are connected to the pillow block 6 by means of tensile rods 30, so that the shield and the parts fixedly connected therewith are rigidly held from the pillow block. The arms 22 and the bars 29 also support brackets 31 which in turn support a floor 32 at different levels, which flooring is preferably made in the form of a grating so that it will be possible to see through it. This flooring is further reinforced and strengthened by the guard rail 33 and its uprights 34. The guard rail is desirable to protect the workmen against falling from the platform 32, and its uprights 34 also perform the additional function of strengthening and stiffening the flooring. This platform 32 and its attendant parts do not require very great strength; it is sufficient if it will support the weight of the workmen necessary to bolt together the steel segments. The arms 3, near their outer ends, are joined by an angle metal semi-circular ring 35 which corresponds to the ring 23 and is preferably identical therewith, and these are so arranged that their horizontal legs project toward each other. These semi-circular rings 23 and 35 have the rollers 26 pivotedly mounted thereon and between them.

*The supporting means.*—The hollow shaft 5 is fixedly mounted in the pillow block 6 which consists of a cap 37 secured by any suitable means, not shown, to the pillow block proper, designated generically by the character 6, the head of this block being designated by the character 38. The cap 37 is fixed to the head 38. This head 38 is supported by the downwardly and divergently extending bracket legs 39 which rest on channel irons 40 on the carriage 7. One of these bracket legs 39 carries a seat 41 supported by a bracket 42 and below this bracket 42 is a platform 43, one part of which is fixed to the leg 39 and another part to an upright 44 which is fixed to two of the radial arms 3. This platform 43 is the one on which the operator of the machine stands and from which he executes the work by means of suitable controllers. This platform also is made preferably in the form of a grating, as is the flooring 32.

Figures 4, 5:
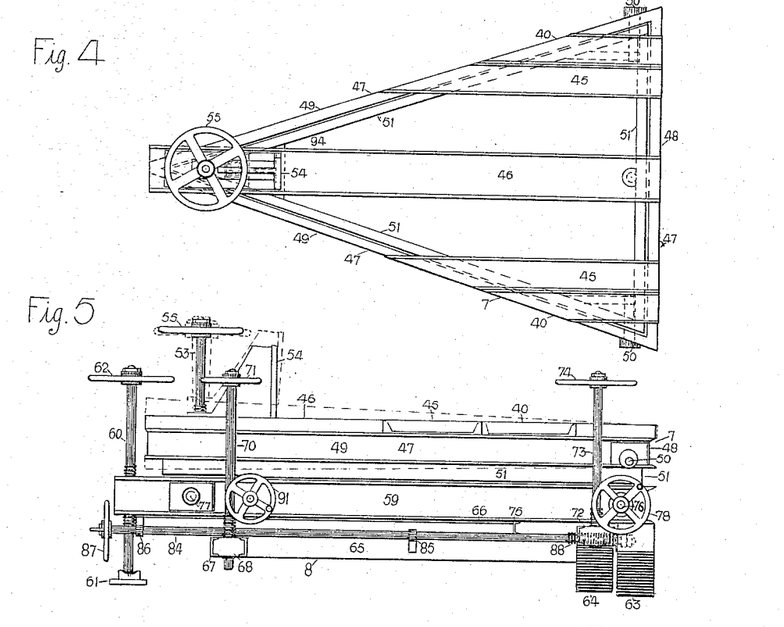
Fig. 4 is a plan view of the two top sections of the carriage.
Fig. 5 is a side elevation of the complete carriage.
Figure 6:
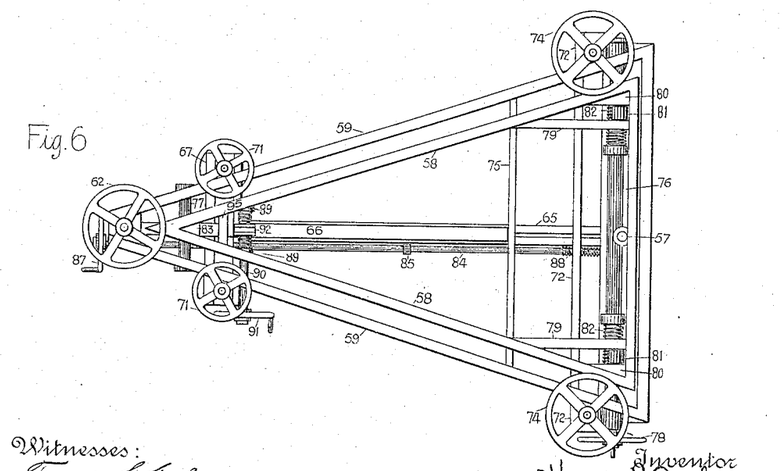
Fig. 6 is a plan view of the bottom portion of the carriage.

The channel irons 40 have similar channel irons 45 adjacent thereto. Centrally disposed between the channel irons 45 is a longitudinally extending channel iron 46 larger than the channel irons 45 and 40, and all these channel irons 40, 45 and 46 are supported by a triangular frame 47 which is preferably in the form of an isosceles triangle with a base 48 and legs 49. One end of each of the channel irons 40, 45 and 46 rests on the base 48 and the other end of each of these channel irons rests on a leg 49, the channel iron 46 being disposed so as to pass through the center of the base and the apex of the triangle and the other channel irons are arranged symmetrically with regard to the channel iron 46, being on either side of the channel iron 46. The triangular frame 47 is pivotedly mounted on pivots 50 parallel to the base 48 and near thereto, which pivots are inwardly disposed and have their inner ends suitably mounted in a triangular frame 51, which frame 51 is symmetrical with the frame 47, but of smaller size so as to nest within the frame 47 and allow ample room for all movements of the frame 47 on the pivots 50. The frame 51 has its upper edge above the lower edge of the frame 47, and its lower edge is considerably below the lower edge of the frame 47. The apex of the frame 51 is provided with a bearing 52 which is suitably fixed to said frame, and resting on this bearing 52 is a screw 53 passing through threads in the base of the bracket 54, which bracket is mounted on the channel 46. The upper end of the screw 53 is provided with a hand wheel 55 which is fixed thereon in any suitable manner. By turning the hand wheel 55 the frame 47 is raised or lowered at its apex and turns about the pivots 50, whereby the axis of the shield and the parts therein may be shifted vertically.

The frame 51 also has a pivot 56 which is vertically disposed and located in a suitable bearing situated at the middle of its base. This pivot 56 extends downwardly where it is journaled in a similar bearing 57 in a frame 58. This frame 58 is a triangle substantially similar in form with the frame 47. This frame 58 is inside a larger triangle 59, which is sufficiently large to allow for transverse movement of the frame 58 therein. The triangular frame 59 is supported at its rear end by screw 60, which has a bearing at its lower end in a cap 61, placed on the floor of the tunnel lining as will be explained below, and at its upper end it has a hand wheel 62 fixed thereon in any suitable manner, so that by turning the wheel 62 the rear end of the frame 59 may be raised or lowered as much as desired, it being understood that the rear of the frame 59 has a suitable screw threaded opening through which the screw passes. The forward end of the frame 59 is fixed to a pedestal 63 on which it rests while the machine is in operation, the pedestal 63 and the screw 60 being the supports which carry the entire weight of the machine while it is in use. The pedestal 63 rests on the floor of the tunnel.

Beneath the triangular frame 59 and suitably attached thereto is the base 8. This base 8 has a pedestal 64 at its forward extremity, and extending rearwardly therefrom is a beam 65 composed of two parallel channels with the flanges projecting inwardly so as to fit over the lower flanges of an I beam 66 fixed to the bottom of the frame 59. The rear end of the beam 65 is fixed to a transversely extending beam 67, which is formed in substantially the same manner as the beam 65, and its channels are united at each end by blocks 68 in which rollers 69 are mounted and through which vertically disposed screws 70 pass similar in all respects to the screws 53 and 60, and which are provided with hand wheels 71. Two of these screws 70 are employed, one at each end of the beam 67 and each of the blocks 68 are suitably screw threaded to receive the screw 70.

Immediately above the pedestal 64 is a transversely disposed beam 72 to which the longitudinally disposed beam 65 is fixed; this beam 72 is substantially the same as the beam 67, just described, except that it is longer and it extends a little beyond the length of the pedestal 64. In this beam 72 are screws 73 with hand wheels 74 fixed thereon, which screws 73 are mounted in precisely the same manner as the screws 70, and so need no further description, except to add that these screws are pocketed at their lower ends in suitable bearings in the pedestal 64, so that by turning these screws 73 the pedestal 64 may either be carried by the machine or made to support the greater part of its weight when the machine is moved in the direction of its length. The forward end of the beam 66 is fixed to a crossing 75 which is fixed to the bottom of the frame 59, and at its rear end the beam 66 is fixed to the bottom of the screw block at the apex of frame 59. The frame 58 is supported within the frame 59 by means of transversely disposed shafts 76 and 77. The shaft 76 is screw threaded in part and provided with a hand wheel 78 fixed thereon, at one end, by which it may be turned. The frame 58 is provided with parallel bearing bars 79 located near each end of its base and connecting the base with the legs of the triangle as shown in Fig. 6. At the extreme ends of the base of this frame 58 are the bearing blocks 80 which are separated from the bearings 79 by a short distance which is sufficient for the rollers 81 which are mounted therein. Said bearings 79 and 80 are also provided with suitable screw threaded perforations through which the shaft 76 extends which shaft is partly screw threaded, and these screw threads 82 on shaft 76 engage with the screw threads in the bearings 79 and 80 so that by turning the hand wheel 78 the frame 58 is shifted transversely within the frame 59, the apex of the frame 58 sliding freely upon the bearing shaft 77 which passes through a block 83 fixed in the apex of the frame 58. This block slides freely on the said shaft 77 because the shaft 76 carries substantially all of the weight.

A longitudinally disposed shaft 84 is mounted on the beam 65 by a suitable bearing 85 and this shaft 84 is supported near the inner end from the frame 59 by a hanger 86, and at its extreme rear end is mounted the hand wheel 87 by which the shaft 84 may be turned. The forward end of the shaft 84 is provided with a screw threaded portion 88 which passes through a screw threaded perforation in the beam 72 and passes through a portion of the pedestal 63 and is secured therein by suitable thrust bearings which prevent longitudinal movement of the shaft 84 with regard to the pedestal 63.

The frame 58 near its apex has suitable thrust bearings 89 in which revolves the shaft 90 which passes through a suitable opening in the frame 59 and is provided with a hand wheel 91 by which it may be turned. The shaft 90 is provided with screw threads which engage suitable threads in a grooved nut 92 which fits in the downwardly depending arm 93 which is fixed in the frame 51 by being fastened to a suitable crossing 94. The frame 58 is also provided with a suitable crossing 95 near the block 83 on which is mounted a roller 96 which is journaled in suitable bearings 97 and 98 which are fixed in the frame 51. The bearing 98 is a part of the bearing block 52 and is preferably integral with it. By turning the hand wheel 91 the frame 51 is shifted around the pivot 56 described above, its rear end being carried by the roller 96.

*Excavator.*—The cutting tool 17 consists of teeth 99 adapted to bite into the soil or earth 100, which teeth are fixed to the cutting edge of the scoop 101, which scoop has an edge 102 and is so curved as to cause the material to pass on to the ring 12 or vanes 13 when the scoop is in its lower quadrant, or perhaps a little more. At other times the cutting edge of the teeth 99 loosen the material and cause it to fall on the bottom of the cut as well as on to the loading ring 12 and vanes 13. Anything that falls on the bottom of the cut will be cleared by the scoop on its next rotation and forced on to loading ring 12 and vanes 13, so that nothing accumulates in the cut. The cutter with its scoop 101, is fixed to a guide bar 103, which guide bar 103 is shown in cross section in in Fig. 2ᶜ. This guide bar 103 has a longitudinal bore extending through the greater portion of its length without screw threads, and for a small portion of its length it is screw threaded. The guide bar 103 slides in grooves formed by bars 104 secured to the channel 16 by bolts 104ᵃ, and it has a cap 105 secured to it by bolts 105ᵃ, on which cap is fastened the cutter 17 in any suitable manner. Through the center of the bore formed by the guide bar 103 and cap 105 passes the screw 106, which screw is an extension of the armature shaft of motor 107, by which it is rotated, thus causing the guide bar 103 with the cutter 17 to move along the length of the channel bar 16. The screw 106 extends the greater part of the length of the channel 16, and has its axis parallel with the flanges of the channel so that its axis coincides with the axis of the channel 16. One end of the screw 106 is fixed to the armature of the motor 107 which is preferably an electric motor, and is fixed to the channel 16; the electric connections for this motor 107 are not shown because they are obvious and it is sufficient to state that they pass through the hollow shaft 14 which is made hollow for this purpose, and the rear end of this shaft 14 is provided with suitable contacts, not shown. It is sufficient to say that the electric connections are such that the direction of rotation of the screw 106 is always under the control of the operator as well as the speed at which this screw turns so that the movement of the cutting blade may be regulated in either direction and at any desired speed. When in operation the blade starts from the center and works outward toward the circumference; when it has finished its cut it is withdrawn again to the center and the machine having been moved forward it is driven forward and repeats its operation, cutting from the center outwardly as before. The motor 107 is so placed on the channel 16 that it will never interfere with the face being cut but clear the same as indicated in Fig. 1.

As stated above, the shaft 14 is journaled in the hollow shaft 9 which is carried in the hollow shaft 5, which shaft 5 is mounted in the pillow block 6. The inner end of the shaft 14 is journaled in a second pillow block 108 which is mounted at the upper extremity of suitably converging bracket legs 109, the lower ends of which are fixed in the channels 45. A motor 110 is mounted on top of the bracket 54 in a frame 111, which frame has horizontally disposed guides 112 which extend to the pillow block 108 and are fastened thereto in any suitable manner. The motor 110 has an armature 113, one end of which is screw threaded and projects along the axis of the guides 112 and engages suitable threads in a cross head 114 which slides freely in the guides 112 but cannot turn or rotate therein. The shaft 14 also has a suitable bearing in the cross head 114 so that it rotates freely in said cross head, but has no movement longitudinally of said cross-head, so that when the armature 113 is rotated the shaft 14 is drawn one way or the other in the direction of its axis, thereby projecting the cutter 17 either into or out of the face being bored. If desired this cutter 17 may be withdrawn entirely within the protection of the shield.

The shaft 14 has a pulley wheel 115 fixed thereon about which passes a belt 116 which belt also passes over idle pulleys which tighten the belt, and thence over the driving pulley 117 on the armature shaft 118 of the motor 119 suitably mounted on the channel 46. The rotation of this motor 119 controls the rotation of the shaft 14 which rotates therewith and operates the cutter 17. Electrical controlling device will, so far as necessary, be described below.

*Loader.*—The hollow shaft 9 has at its forward end a disk 10 from which extend the radial arms 11, that carry the rim 12 of the loader, which rim has also the inwardly disposed and diagonally extending vanes 13. These vanes are fixed to the rim 12 in any suitable manner and the spokes 11 are given a slight twist so that the vanes may be attached thereto at the proper angle. On the outside of the rim 12 are the smaller diagonal vanes 13$^a$. Material is prevented from prematurely leaving the vanes before it reaches the chute 18 by a segmental plate 120 secured to the arms 3 in the lower quadrant of the circle. This segmental plate 120 extends somewhat more than 90 degrees. On the back of this segmental plate 120 and near its lower edge are mounted bearings 120$^a$, between which and the shield ring 2 are pivotally placed rollers 120$^b$, the faces of which rollers project through suitable openings, not shown, in the plate 120, thus allowing the inner edge of rim 12 to bear against the rollers 120$^b$ when excavated material is carried on the loader, thereby reducing the friction. These rollers may be mounted at intervals on the segmental plate 120, and also in the flange ring 27 if desired. A detail of these rollers is shown on sheet 2 at Fig. 2$^d$.

The inner end of the hollow shaft 9 is provided with a suitable winch 121, the purpose of which will be described below, and next to this is a large pulley 122 which is fixed on the shaft 9 and a belt 123 is mounted thereon and drives the same from a driving pulley 124 which is on an armature shaft 125 of a motor 126 mounted on the channel iron 46. This belt 123 also has tightening pulleys precisely as the belt 116, which tightening pulleys are mounted on a crossing 127 which connects the bracket legs 39 with the bracket legs 109. The winch 121 is used to wind a rope, not shown, which is passed over the rollers 26 and is for hoisting the segmental plates to the positions where they are to be bolted to the lining ring.

*Controlling devices.*—As electric motors are employed, the controlling devices employ the usual controllers and rheostats. By suitable wiring, not shown, the motors are operated by the controllers 128, 129, 130 and 131. These controllers control the motors 107, 110, 119 and 126 respectively, both as to their direction of rotation and the speed of rotation. The handles of these controllers 128 to 131 inclusive are suitably located near the platform 43 and seat 41, which seat and platform accommodate the operator of the machine. The wiring for these controllers 128 to 131 inclusive passes through suitable tubes 132 immediately below the controller board 133 which is fixed to one of the radial arms 3 by suitable means 134.

*Chute and conveyer.*—The chute 18 is located at the discharge end of the segmental blade 120 and is so arranged and disposed that the vanes 13 of the rotary loader will discharge the excavated material into said chute. This chute has a bottom 135 which is preferably the shape of a parallelogram, but is not rectangular, and is suitably inclined so that the material discharged upon it will slide to the conveyer 19. The sides 136 of the chute 18 are made of any suitable shape so that the material will move properly when placed on the bottom of said chute. This chute 18 is supported by means of brackets shown in dotted lines in Fig. 3 or by any other suitable means.

The conveyer 19 is located so that the material 137 at the discharge end of the chute 18 will fall on the conveyer belt 138 of the conveyer 19. This conveyer belt 138 is an endless belt of the conventional type, or any other suitable form for the purposes of carrying dirt and any other material that may be discharged from the chute 18. The belt 138 passes at its forward end from a series of wheels 139 mounted on a common axle 140 which is supported in a suitable frame 141 that is pivotedly mounted on a bracket 142 which is fixed to the shield ring. The conveyer 19 is provided with suitable longitudinal sills 143 which are fixed at their forward ends to the frame 141 and at their rear ends to a similar frame, not shown, which has a second series of wheels, not shown, the same as the forward set just above described. The rear end of the conveyer 19 is supported by a roller bearing 144 which is suitably mounted on trucks 145 and 146 at each end thereof, which trucks run on channel irons 147, suitably placed on the segmental lining rings 148. The roller 144 rests under the upper longitudinal sills 143 of the conveyer 19. This mounting of the conveyer 19 enables it to trail after the excavating apparatus as it proceeds forward from time to time, and by reason of its pivotal mounting of the forward end, permits it to accommodate itself so that it may load into a number of sets of cars 20 on different tracks 149, thereby allowing the cars on one track to be shifted while the cars on the other track are being loaded. The conveyer belt 139 is driven by any suitable means, not shown. The tracks 149 are suitable construction tracks of the conventional type for tunnel purposes and are placed in the usual manner on the lining rings 148.

*Modification for pneumatic boring.*—In the foregoing has been described one embodiment of my apparatus which is suitable for all cases where pneumatic pressure is not required, and it is also suitable where pneumatic pressure is required and used under present conditions. However, working under such conditions has the great disadvantage of being very severe on the workmen, thereby increasing the cost of excavation. The embodiments of my invention described below largely if not entirely obviate this objection by placing the working parts of my excavator under pneumatic pressure and leaving the operator and other persons connected with the apparatus in an atmosphere of normal, or substantially normal pressure.

Referring to Figs. 7 to 11 inclusive, the shield 160 is provided at its forward end with a reinforcing ring 161 and back of the reinforcing ring 161 is a suitable space for the loader, which is identical with that above described, and is omitted for the sake of conciseness and clearness. Back of this loader is a partition 162 which extends across the shield 160 and has certain openings which will be described below. This partition 162 rests against a reinforcing rib 163 and similar ribs 164 are placed at suitable intervals to reinforce the shield ring 160. The partition 162 is provided with a center perforation in which is mounted a bearing 165, which bearing is suitably supported by the reinforce 166 which runs transversely beneath it. In this bearing 165 is a hollow shaft 167 which is substantially identical with the shaft 9 and for the same purpose. Inside the shaft 167 is a second shaft 168 which is also hollow and is substantially the same as the shaft 14 and carries the same excavator. This shaft 168 is made hollow so as to carry suitable electric conductors and is provided with suitable contacts, not shown, through which a motor on the cutting arm is controlled precisely as is the motor 107. The partition 162 has a second opening 169 through which the excavated material is passed in a manner which will be described below, and which is identically the same as the manner in which the excavated material is placed on the chute 18 above described, a small projection being used in lieu of this chute 18.

Figures 8, 9, 10, 11:
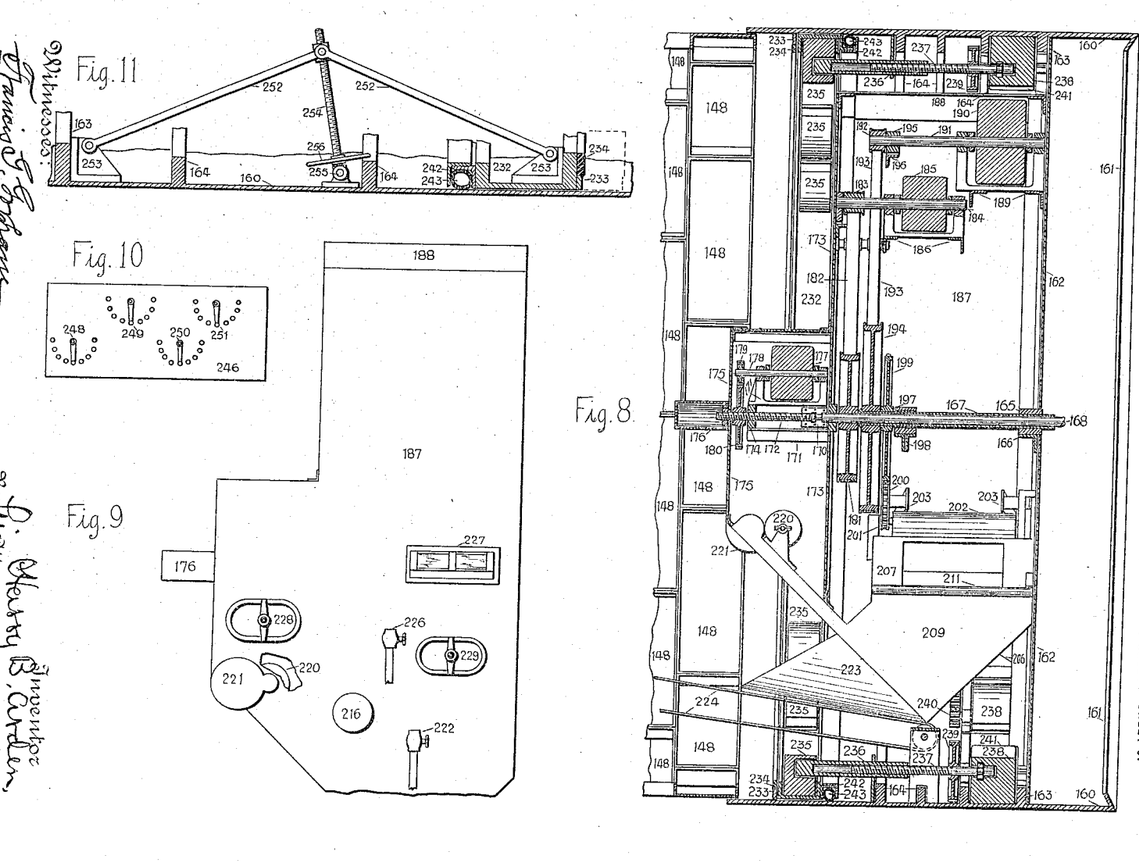
Fig. 8 is a vertical, longitudinal section of the structure shown in Fig. 7.
Fig. 9 is an elevation of the side of a portion of the casing inclosing the mechanism shown in Fig. 8.
Fig. 10 is a plan view of the controller board.
Fig. 11 shows a modified form of apparatus for forcing the shield forward in the bore.

The shaft 168 is provided with the excavating tool, not shown, at its forward end. At its rear end it is provided with a block 170 mounted between suitable guides 171 in which block is also mounted a screw 172, which screw does not rotate, but is fixed in said block 170, the shaft 168 turning freely in this block 170. The guides 171 are suitably supported at their forward ends by a partition 173 parallel with the partition 162, and at their rear ends by a bar 174 which runs transversely of the axis of the shield. The screw 172 passes through a third partition 175 into a cylindrical cap 176 which is fixed to said partition 175 with an air tight joint. The upper guide 171 carries the motor 177 suitably supported thereon and provided with an armature 178 on which is a pinion 179 that meshes with a larger gear 180 which has a screw threaded hub mounted on the screw 172, so that the rotation of the armature 178 causes the screw 172 to move in the direction of its length, thereby forcing the shaft 168 to do the same thing. The shaft 168 is rotated by a pulley 181 which is driven by a belt 182, which runs from a small driving pulley 183 on the shaft 184 of the armature of the motor 185, which motor 185 is supported on suitable angle irons 186, which pass transversely of the excavator and are secured to the side walls 187 of the pneumatic chamber included between the transverse partition 162 and the rear partition 173, the walls 187, just above mentioned, the top 188 and the air locks at the bottom which will be described below. Suitable crossings 189 mounted the same as the crossings 186 support a motor 190 provided with an armature shaft 191 which drives a pulley 192, over which passes a belt 193 that passes around a larger pulley 194 fixed on the hollow shaft 167, so that this hollow shaft is driven by the motor 190 just as the motor 185 drives the hollow shaft 168. A suitable bearing 195 supported by a proper crossing 196, similar to the crossings 189 and 186, supports one end of the armature shaft 191; a similar bearing 197 is supported by suitable angle metal crossings 198 fixed at their ends to the side walls 187 and this bearing 197 supports the hollow shaft 167 near the pulley 194. Adjacent to the pulley 194 the hollow shaft 167 carries a sprocket wheel 199, fixed thereon, which engages a chain 200 which passes around a small sprocket wheel 201 on a shaft provided with a suitable drum, not shown, which drum carries an endless belt 202 of the conventional type and in the conventional manner, the other end of this belt 202 passing over a second drum, not shown, mounted in the conventional way. The rotation of the shaft 167 gives motion to the belt 202 through the medium of the sprocket wheel 199, chain 200, and sprocket wheel 201 fixed on the shaft on which is mounted the drum over which the belt passes. Suitable guides 203 prevent the material from scattering from the belt 202. The belt 202 is so arranged and disposed that it is below the flange at the lower edge of the opening 169, so that the excavated material passes from the loader on to this belt 202. The belt 202 is arranged in an extension of the air chamber, above described, and this extension runs transversely from one of the walls 187 to the shield ring 160. This chamber has a roof 204, a rear wall 205 and a sloping bottom 206, all of which are suitably connected together with air tight joints, and they are also connected to the shield ring 160, the partition 162 and the side wall 187. The side wall 187 has a suitable opening for the belt 202 to pass through and discharge its load into the air locks.

Figure 7:
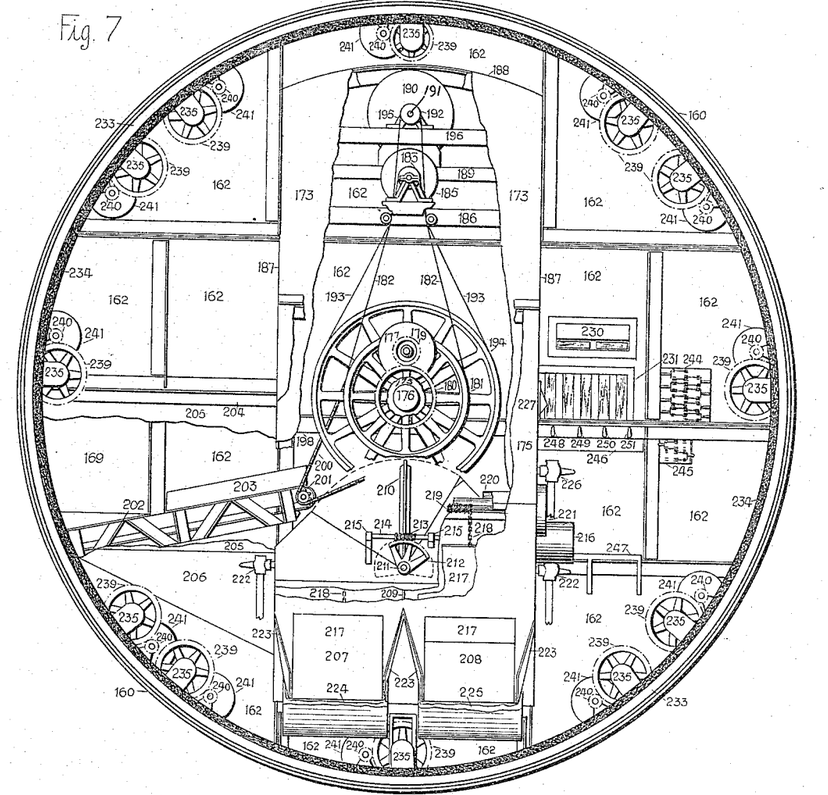
Fig. 7 is a rear elevation of a modified form of the machine suitable for working where pneumatic pressure is employed.

The bottom of the chamber between the side walls 187 is closed by air locks 207 and 208. These two air locks are preferably made with their bottoms inclined, like hoppers, and they are supported by the wall 187 and a partition 209, and closed alternately from the air chamber by a common cover 210 which is fixed to a suitable shaft 211 journaled on top of the partition 209. On this shaft 211 is also fixed a segmental worm gear 212 which meshes with a worm 213 on a shaft 214 suitably supported by bearings 215 and rotated by a suitable motor, not shown, and carried in a cylindrical cap 216 on the side wall 187 opposite the belt 202. By rotating this worm 213, in one direction or the other, either one of the locks 207 or 208 may be closed. In Fig. 7 the cover 210 is shown in its intermediate position which, of course, is a position it occupies only when both of the discharge gates 217 of the locks 207 and 208 are closed. In Fig. 7 the parts are not shown in an operative position. When the cover 210 is over the lock 207 it acts as a chute to carry the excavated material from the belt 202 to the lock 208. In the reverse position, that is, when over the lock 208, it acts simply as a cover and the excavated material falls directly into the lock 207 from the belt 202, so that by merely throwing the cover 210 as above indicated, the material is loaded into the proper air lock.

The locks 207 and 208 have identical discharge gates which are operated by an identical mechanism so that a description of one will answer for both. These gates 217 are either raised or lowered by means of a chain 218 wound on a suitable windlass 219 which is rotated by a suitable motor 220; intermediate mechanism connecting the motor and windlass is carried in a suitable cap 221 similar to the cap 216, and adjacent thereto. The gates 217 are made of any suitable shape and are carried between guides in the conventional manner. These gates 217 do not rise and fall vertically, but at an angle of substantially 45 degrees. These gates 217 are each of them drawn into a chamber attached to and forming a part of the lock. The side walls 187 are provided with suitable valves 222 by which the pressure in the air locks 207 and 208 may be relieved, as desired, so that the gates 217 may be drawn. These valves also re-charge the locks, so that they must be two way valves and connected with suitable source of air supply under pressure, not shown. The locks 207 and 208 on their exterior walls are provided with converging guides 223 which direct the material on to the belt when the gates are open to discharge material from the air locks. The air lock 207 has a belt 224 and the lock 208 has a similar belt 225. As these belts are the conventional ones and substantially the same as the belt 202, a detailed description is unnecessary.

The side wall 187 opposite the belt 202 is provided with a suitable air valve 226, the same as the valves 222 and connected in the same manner, and also has suitable windows 227 through which the operating mechanism in the air chamber can be observed, and also with suitable man holes 228 and 229 through which access may be had to the interior of the chamber. A similar window 230 is placed in the partition 162 so that the operator can observe the upper portion of the face being excavated. The glass in the window 230 is set as nearly as possible perpendicular to the line of vision so that the operator can look up. Another window 231 gives a view to the operator of the central and lower portions of the face being bored, the operator being outside of the air chamber and in air at substantially normal pressure.

*Means for forcing the shield.*—The rear portion of the shield has the ribs 164 omitted and is in the form of a cylinder with a smooth interior wall. In this interior near the rear of the shield ring 160 is an annulus 232 which extends entirely around the interior of the shield and snug against the same, and is preferably in the form of a channel iron in cross section. Immediately in the rear of the annulus 232 is a ring 233 which is a plain annulus in form and rectangular in cross section, and this ring 233 is fixed to the annulus 232. The ring 233 and annulus 232 carry and support a packing ring 234 which is secured to the other two rings in any suitable manner. This packing ring 234 and ring 233 may be shoved against the tunnel lining ring in a manner described below, whenever desired. The annulus 232 carries a number of large and substantial blocks 235 which are mounted at suitable intervals and fit snug therein and each of these blocks is provided with a hollow spindle 236 pivotedly mounted therein and forwardly extending parallel to the axis of the shield. The interior of each of these spindles 236 is hollow over the greater portion of their length and is screw threaded to receive a screw 237, the forward end of which is mounted in a block 238 in all respects similar to the blocks 235 and held between the flange 163 and a rib 164. These blocks 235 and 238 are held in place by bolts or other suitable means, not shown. The screw 237 turns freely in the block 238, but has no movement longitudinally independent of said block. The screw 237 is provided with a gear 239 that meshes with a pinion 240 carried by the armature of the motor 241 which drives its screw 237 in either direction, as desired by the operator. The annulus 232 is also provided on its forward face with an angle metal ring 242 having three sides and open on its exterior side, and is provided with a pneumatic tube 243 which is connected with the source of air pressure by means not shown, and also by means of a two way valve, so that said tube 243 may be either inflated or deflated at the volition of the operator. When this tube is inflated an air tight and water tight joint is formed between the annulus 232 and the interior of the shield 160, it being understood that the ring 242 is secured to the annulus 232 with an air tight and water tight joint.

In Fig. 8 the segment setting apparatus is omitted for clearness and conciseness. It is understood that it is to be used in this construction precisely as shown in Fig. 1, and would be connected to the interior of the annulus 232; as such a connection is obvious it is not necessary to describe it further.

All the motors 241 as well as the motors 177, 185, 190 and 220 are controlled by the operator by means of suitable switches 244, 245 and the controllers 246. While the operator is in control of the apparatus he stands on a platform 247, fixed to the partition 162, which is suitably located so that he can manipulate the machinery and observe the progress of the work through the windows 230, 231 and 227, whereby he can have knowledge of the operation of the machine and at the same time be working in normal air pressure, or nearly so. The switch 244 governs the motors 241, so that the operator can throw them in series or multiple in any combination and with any direction of rotation, whereby the shield may be worked or shifted to move forward or to alter the direction of its axis, as may be desired. All these switches 244 are connected with one of the controllers shown in Fig. 10 and designated generically 246, say the controller 248. The switch 245 controls the gates 217 of the air locks 207 and 208 without a controller, and also the cover 210. The motors 177, 185 and 190 are operated by the controllers 249, 250 and 251 respectively. Other controllers, not shown, govern the motors that operate the belts 224 and 225.

In Fig. 11 is shown a slight modification for forcing the shield identical with what has been described above, except that instead of the screws 237 and their coöperating parts, toggles 252 are substituted. These toggles press against the blocks 253 to which they are pivotedly connected in a conventional manner and these blocks 253, except for their connection with the toggles 252 are similar in structure and identical in function with the blocks 235 and 238. The toggles 252 are operated by a suitable screw 254 which is pivotedly mounted on a pivot 255 fixed to the shield 160, and the screws 254 are each provided with a hand wheel 256 by which they may be rotated. If desired a gear wheel may be substituted for a hand wheel and motors employed. The precise manner in which the toggles 252 are operated is immaterial, provided it is sufficiently powerful.

While I have shown only screws and toggles for forcing the shield, either of which may be used, it is obvious that any suitable mechanism may be employed for this purpose. I have shown one of the best embodiments known to me, but others may be employed and to employ them is within the scope of my invention.

*Operation.*—In describing the operation of my invention I will follow the plan pursued in describing the apparatus, that is I will first describe the operation of the apparatus when used without air pressure and second when used with air pressure.

Referring to Figs. 1 to 6 inclusive: Assuming the bore to have been started and the machine to have been put in place as shown in Fig. 1 the face to be bored being substantially vertical and some of the segmental lining rings 148 put in position, the machine is supported on its pedestal 63 at its forward portion, said pedestal resting on the floor of the tunnel, and at its rear end by the screw 60 supported on one of the lining segmental rings 148, the operation would be as follows:

The loader 12 is first started in operation and then the belt 138 of the conveyer 19 is put in motion and cars are arranged as shown, to receive the excavated material. The cutter 17 is then brought to its central position near the shaft 14 and the shaft 14 is then set in rotation and the motor 110 is made to operate, thereby forcing the shaft 14 longitudinally in the direction of the face of the cut thereby causing the cutter to bore into the face; as soon as this boring commences the motor 107 is set in motion thereby causing the cutter to move in a spiral path with progressively and constantly increasing radius. The excavated material passes through the scoop 101 or else is dislodged and falls directly either on to the loader 12, or adjacent thereto. A small portion will fall back on to the floor of the spiral being bored but this will be removed by the next revolution of the cutter. A small portion will fall between the face of the cut and the shield, but this can be removed by manipulating the cutter 17 and drawing it inward while extended sufficiently to reach the maximum diameter of the bore. A small proportion of the excavated material may pass between the exterior of the loader 12 and the interior of the shield 2, in which case this material is removed by the exterior vanes 13ª and discharged into the chute 18. The excavated material passes from the chute 18 to the conveyer belt 138 which delivers it into the cars 20 by which it is removed in the conventional manner. The amount of material excavated by the cutter 17 depends upon the speed of the motors 119 and 107, so that the volume cut may be proportioned to the character of the material. The speed of rotation of the shaft 14 is governed by the motor 119 and the thickness of the spiral paring made by the cutter is regulated by the motor 107 according to the refractoriness of the material being excavated. This rotation and cutting of the bore continues until a cut has been made a little larger in diameter than the diameter of the shield 2. The motor 110 is then rotated and the shaft 14 is drawn inwardly till the cutter 17 grazes the forward edge of the shield, when one or two revolutions of the cutter will clean up and deposit on the loader any loose material remaining on the floor of the cut forward of the shield, the motor 107 being inoperative during this operation. This causes any material which may have been lodged between the shield two and the face of the cut 100 to be gathered up by the loader 12 and passed to the chute 18, as above described. This excavated material is designated 137 and its movement is clearly shown in Fig. 1. The motor 107 is then run in the opposite direction thereby drawing the cutter 17 to its central position near the shaft 14 and at the same time the shaft 14 is drawn inwardly by the motor 110 until the channel 16 and all parts supported thereby are well within the shield so as not to interfere with the movements thereof when it is shifted forward.

While the machine has been operating as above described, a rope, not shown, has been passed around the windlass 121 and over a roller 26, by which means the lining segmental sections 148 are then drawn up, resting on the rollers 26, and when in their proper positions are bolted in the conventional manner by bolts, not shown. The workmen in placing and securing the upper segmental plates 148 stand on the platform and steps 32. In setting the lower segments it is obviously unnecessary for them to stand on these steps. The segmental plates 148 are put in position as rapidly as possible and while the cutter 17 is in operation. In Fig. 1 the width of the cutter 17 is such that it must make two cuts to allow the apparatus to be advanced the width of one segmental plate 148, but it is obvious that this can be varied as desired by making the cutter 17 and its actuating mechanism more or less powerful.

As above set forth, the cutter 17, the loader 12, and the conveyer 19, are all under the control of the operator through the controllers 128, 129, 130 and 131. By means of these controllers he continues the operation of the machine as above described, until the excavator 17 has bored the tunnel sufficiently to advance the apparatus. When this is done he withdraws the cutter 17 as above described and then shuts down the motors.

If the machine is to be moved forward into the cut without change of direction the operation is as follows. The hand wheels 74 and 71 are turned so as to force the ends of the screws downward thereby causing the base 8 to carry the weight of the machine. The screw 60 is then withdrawn so that it will clear the flanges of the segmental ring 148 during the moving if this is necessary. If the moving is from one plate to another farther than when the moving is entirely within two flanges of a single segmental plate. The bearing cup 6¹ is similarly shifted and similar cups are preferably used under the screws 70, but as these screws may have bearing on the segmental plates, these cups 61 are not absolutely necessary. The hand wheel 87 is then turned which causes the rotation of the shaft 84 thereby forcing the pedestal 63 forward, this pedestal 63 being a part of the car 7 and rigidly connected therewith, the machine is thus moved the desired distance. The rotation of the shaft 84 causes this pedestal and the parts fixed thereto to move forward into the bore. When this movement has been made the proper distance, the rotation of the wheel 87 is stopped, the screw 60 is lowered and the screws 70 and 73 are raised, thereby again placing the weight of the machine on the pedestal 63 and the screw 60. The base 8 being then suspended from the beam 66 the wheel 87 is then turned in the reverse direction thereby causing the base 8 to be drawn forward to the position shown in Fig. 5, when it is ready for further use as above described.

If the tunnel is to be bored straight ahead the operations above described with regard to the cutter 17 and its actuating parts and the loader 12, &c., is repeated. If, however, the direction of the cut is to be slightly changed, as is sometimes necessary where the tunnel is curved either vertically or horizontally, or both, the machine 1 must then be shifted so as to be accommodated to this change in direction. This is accomplished in the following manner. To change direction in a vertical plane the screw 53 is raised or lowered, as much as desired, thereby causing the axis of the machine to shift round the pivots 50. This may also be partially accomplished through the screw 60 and pedestal 63. If the machine is to be shifted in a horizontal plane the wheel 91 is rotated thereby swinging the rear end of the frame 51 on the pivot 56. If the direction of the machine is to be changed in both a horizontal and a vertical plane these two movements just above described are employed, so that the compound of the two is the desired change in direction. The operation of the shafts just above described is usually sufficient, but not always, for sometimes the axis of the machine is a little out of line with the true axis of the tunnel in which case the machine must be shifted bodily to the right or the left, and this is accomplished by means of the screws on the shaft 76 by turning the hand wheel fixed on said shaft in the desired direction.

The frame 58, which supports the weight of the machine, is mounted on the screw portions of the shaft 76 and also at its apex is supported by the shaft 77 so that the revolving of these screws on shaft 76 carries the machine to the right or left, according to the direction of rotation of shaft 76.

It is obvious that all changes in direction or in position must be very slight and must be repeated as often as necessary. The conveyer 19 trails behind the machine 1 and its tracks 147 are moved forward from time to time so as to correspond with the progressive movement of the machine. The tracks 144 are also brought forward in a similar manner. The finishing of the tunnel after the segmental plates 148 are in position is done in the conventional manner.

The operation just above described of the machine shown in Figs. 1 to 6 inclusive is sufficient and satisfactory where no air pressure is necessary, or where the machine is placed in an atmosphere under pressure, the bulkhead for this purpose being carried some distance to the rear of the machine in the conventional manner. However, this forces the men to work under unnatural conditions which are very hard on them, so that labor when thus employed is very expensive. To obviate this undue strain on the men and to reduce the cost of tunnel boring, I provide the apparatus shown in the remaining figures. From these figures, as above stated, all unnecessary details have been omitted for the sake of clearness and conciseness of description. In this apparatus the excavator bores into the face of the tunnel and the loader acts in precisely the manner above described, so that a repetition of this description is unnecessary. The segmental sections 148 are also placed in the same identical manner, so that the description of the setting of these segmental plates 148 is here omitted.

When my improved structure shown in Figs. 7 to 11 inclusive, is in operation, pneumatic pressure to the required amount is maintained between the face of the cut and the partition 173, etc., so that a pneumatic chamber is provided as above described. The pressure in this chamber may be far in excess of what any human being can live in, generally speaking, no one enters the chamber while the pressure is on, but for obvious reasons it is made as low as possible. However, if desired, a person may enter the pneumatic chamber through the air locks 207 or 208 while the apparatus is in operation. The operator stands on the platform 247 and by means of the controllers 246, switches 245 and 244 and valves 226 and 222 controls the operation of the machine. While so doing he observes through the windows 230, 231 and 227. The excavated material passes through the opening 169 in the partition 162 on to the conveyer 202 and between guides 203. This excavated material passes over the belt 202 either into the air lock 207 or the air lock 208, depending upon the position of the cover 210, and keeps on passing until the air lock has been sufficiently filled. Meanwhile the other air lock has had its gate 217 raised, after reducing the air pressure in the conventional manner and discharged on to the belt 224, which belt carries the material to the cars, just as the material 137 on the belt 138 is carried to the cars 20 in Fig. 1. As soon as the lock is emptied, the gate 217 is closed, air pressure applied in the conventional manner, the cover 210 is then swung over to cover the other lock which has just been filled, and the excavated material then passes over the belt 202 to the empty lock, and the filled lock then has its pressure reduced, its gate 217 opened and material discharged precisely as above described.

Suitable means, not shown, are placed so as to illuminate all parts of the apparatus which is under pneumatic pressure, so that the operator will have no trouble in observing through the windows 227, 230 and 231 the working of the excavator 17, the loader and the air locks. When the excavator has bored the full diameter of the tunnel, he withdraws the same as above described and when it is well within the loader rim 12 he, by means of the switches 244 and controller 246, causes the motors 241 to operate, at the same time reducing the air pressure in the pneumatic chamber by opening the valve 226, thus allowing the screws 237 to force the shield forward and at the same time practically maintain the desired air pressure in the pneumatic chamber and not unduly increase it. If the machine is to be moved forward in a straight line all the motors 241 are actuated simultaneously and have their armature rotated in the same direction. If the direction of the tunnel is to be changed some of the motors are thrown out of circuit so that only a part of the shield is forced forward thereby giving the proper change in direction to the apparatus. As soon as the shield is in its new position the motors are all reversed and the annulus 132 drawn to its forward position so that a new set of segmental plates 148 may be inserted, while under the protection of the shield 160.

If quick sand or similar material should suddenly be encountered and begin to leak in between the lining and the rear end of the shield, the annulus 232 would be immediately forced back against the last ring formed by the segmental plates 148 thereby closing the same with a joint in which the packing 234 would act as a gasket, and this water tight joint could be further supplemented by admitting pressure to the pneumatic tube 243 which would close the joint between the annulus 232 and the shield 160, thereby excluding all liquid matter from the interior of the shield. A bulkhead would then have to be erected in the rear of the machine and within the segmental lining ring in the conventional manner, and the ring joints would have to be caulked forward of this bulkhead; this having been done air pressure would be applied sufficient to exclude the quick sand, the annulus 232 would then be drawn forward in the shield 160 and a new segmental ring would be set in place and the joints between that ring and the preceding ring would be calked as above described. The excavator 17 and loader 12 having excavated in advance of the shield 160 this shield would again be forced forward and another segmental ring put in place. These operations would be continued under air pressure forward of the bulkhead above described until the machine had run out of the quick sand or slime deposit, when the bulkhead would be removed and the machine would proceed as before described.

In the foregoing has been described the operation of my machine for a bore circular in cross section. This is the conventional form, but the use of my invention is not confined thereto. It is obvious that by frequently reversing the direction of rotation of the screw 106 the cutter 17 may be placed a greater or less distance from the shaft 14 thereby enabling a bore to be made elliptical or even rectangular in cross section, or any other suitable cross section. While boring an irregular cross section the operator would have to be in constant control of the cutter and the apparatus would not be automatic to the same extent that it is where the bore is circular in cross section.

I do not regard my invention as restricted to the precise embodiments described above, but regard it as broad enough to cover all structures that come within the scope of the annexed claims.

What I claim is:

1. In a tunnel boring apparatus, means for excavating earth, means for loading the excavated material, and means for hoisting and supporting while setting, segments of a lining ring.

2. In a tunnel boring apparatus, means for excavating, means for loading, a shield to protect said excavating and loading means and partitions with air locks adjacent to said excavating and loading means, so that the same may be operated under pneumatic pressure.

3. In a tunnel boring apparatus, means for excavating, means for loading, a shield to protect said excavating and loading means, and means for moving said shield, excavator and loader vertically, horizontally and radially.

4. In a tunnel boring apparatus, a shield and means for supporting the same, an excavator mounted so as to operate in a spiral path adjacent to the front of said shield, and a rotary loader with diagonally disposed vanes mounted to operate within said shield and adjacent to said excavator.

5. In a tunnel boring apparatus, a shield and means for supporting the same, an excavator mounted so as to operate in a spiral path adjacent to the front of said shield, a loader mounted to operate within said shield and adjacent to said excavator and diagonally disposed and fixed means on said loader for forcing said excavated material toward the rear of the machine.

6. In a tunnel boring apparatus, a shield and means for supporting the same, an excavator mounted concentric with said shield and adapted to operate adjacent to the front thereof, a loader mounted to rotate in said shield and concentric therewith, a series of rollers near the upper portion of said shield and means for supporting said rollers.

7. In a tunnel boring apparatus, an excavator and means for supporting the same, a shield and means for supporting the same, so that said shield may be moved to conform to any change in direction in the tunnel and a loader mounted in said shield and adjacent to said excavator.

8. In a tunnel boring apparatus, a shield and means for supporting the same, an excavator mounted concentric with said shield and means for actuating the same, a loader in said shield and adjacent to said excavator, an air tight partition in said shield so that said excavator and loader may operate under pressure and means for causing a tight joint between the shield and tunnel lining rings.

9. In a tunnel boring apparatus, a shield, an excavator, a loader, air tight partitions in said shield so that said excavator and loader may be operated under pressure and means for permitting the material to be removed from said loader without interrupting the operation of the excavator or loader.

10. In a tunnel boring apparatus, a shield and means for moving same, an excavator and a loader mounted in forward portion of said shield, an air tight partition in said shield back of said excavator and loader, means in the air tight partition whereby the operator of the machine may observe the progress of the work in the pneumatic chamber while himself being in an atmosphere of substantially normal pressure.

11. In a tunnel boring apparatus, a shield, a loader mounted to rotate in said shield and an excavator mounted to operate adjacent to said loader, said excavator being provided with a guide bar, a screw for shifting the same and means for rotating the screw.

12. In a tunnel boring apparatus, a shield, an excavator, a means for supporting said excavator, said excavator being connected with a guide bar, a screw adapted to shift said guide bar, and means for rotating the screw.

13. In a tunnel boring apparatus, means for supporting an excavator, an excavator provided with a cutting edge and secured to a guide bar, a screw and a motor with its armature fixed to said screw for rotating said screw.

14. In a tunnel boring apparatus, means for supporting an excavator and an excavator provided with a guide bar, a channel iron guide in which said guide bar slides, a screw for shifting said guide bar, means for rotating said screw about its axis, a disk secured to said channel iron, a shaft fixed to said disk and a means for rotating said shaft about its axis.

15. In a tunnel boring apparatus, a ring and means for supporting the same, said ring being provided with diagonally extending and inwardly projecting vanes.

16. In a tunnel boring apparatus, a ring and means for supporting the same, said ring being provided with exterior and interior vanes.

17. In a tunnel boring apparatus, a ring, a means for supporting the same, said ring being provided with exterior and interior diagonally extending vanes.

18. In a tunnel boring apparatus, means for supporting a ring so that it can be rotated, a ring rotatively mounted in said supporting means and inwardly projecting and diagonally disposed vanes secured to said ring.

19. In a tunnel boring apparatus, a shield, an excavator mounted in said shield, a means for actuating the same, a loader mounted in said shield, a means for actuating the same, a conveyer mounted in said shield, a means for actuating the same and a pneumatic chamber, in which said excavator, loader, conveyer and actuating mechanism are mounted.

20. In a tunnel boring apparatus, a shield, a pneumatic chamber within said shield, locks in the walls of said chamber, an excavator and means for actuating the same in said chamber.

21. In a tunnel boring apparatus, a shield, an excavator, a loader and a conveyer belt, and motors for actuating said excavator, loader and belt and a pneumatic chamber in said shield in which said motor, excavator, loader and belt are located.

22. In a tunnel boring apparatus, a shield, a pneumatic chamber in said shield and windows in the walls of said pneumatic chamber, means for excavating and loading in said pneumatic chamber and means exterior to said chamber for controlling the operation of said excavating and loading means.

23. In a tunnel boring apparatus, a shield, means for excavating and loading, a pneumatic chamber in said shield in which said excavator and loader are located and means for passing the excavated material out of said pneumatic chamber.

24. In a tunnel boring apparatus, a shield, a pneumatic chamber in said shield, a pair of adjacent air locks in said chamber and a common cover for said locks whereby one lock may be loading while the other is unloading.

25. In a tunnel boring apparatus, a shield and a pneumatic chamber in said shield, a pair of air locks in the walls of said pneumatic chamber and means under each of said locks for conveying away the material passed through the lock above it.

26. In a tunnel boring apparatus, a shield, an annulus in said shield, means for shifting said annulus in said shield and means for forming an air tight joint between said annulus and shield whereby the entrance of water, quick sand or similar material between said annulus and said shield may be prevented.

27. In a tunnel boring apparatus, a shield, an annulus, means for moving said annulus in said shield, and a pneumatic tube located at one edge of the periphery of the annulus so that when air is supplied to said tube it will act as a gasket between said annulus and shield.

28. In a tunnel boring apparatus, a shield, a series of rollers and means for mounting the same adjacent to the upper part of said shield so that the segmental lining plates may be drawn thereon to their proper positions and be supported while being secured.

29. In a tunnel boring apparatus, a shield, a series of rollers and means for supporting the same adjacent to the periphery of said shield, so that the segmental lining plates may be drawn into position thereon and supported while being secured, and platforms mounted near the said rollers on which the men can stand while securing the plates in place.

30. In a tunnel boring apparatus, a shield, a series of rollers, means for supporting said rollers adjacent to the outer surface of said shield, a winch and means for rotating the same, so that the segmental lining plates may be drawn to their proper positions on the rollers and supported thereon while being fastened in position.

Signed at New York in the county of New York and State of New York this first day of May A. D. 1908.

HARRY B. ARDEN.

Witnesses:
O. E. EDWARDS, Jr.,
GUS. I. ARONOW.

Copies of this patent may be obtained for five cents each, by addressing the "Commissioner of Patents, Washington, D. C."